Patented Nov. 5, 1940

2,220,713

UNITED STATES PATENT OFFICE 2,220,713

MANUFACTURE OF ALKYL FLUORIDES

Aristid V. Grosse and Charles L. Thomas, Chicago, Ill., assignors to Universal Oil Products Company, Chicago, Ill., a corporation of Delaware No Drawing. Application February 25, 1938, Serial No. 192,499

10 Claims. (Cl. 260—648)

This invention relates more particularly to a process for the manufacture of alkyl fluorides by the direct addition of hydrogen fluoride to aliphatic olefins and cyclo-olefins.

Alkyl halides have found various uses in chemical industry in recent years. In experimenting with the manufacture of this class of compounds, it has been found that the ease of addition of hydrogen halides to unsaturated chain and ring hydrocarbons is greater with higher molecular weight hydrogen halides. Thus, for example, it is considerably easier to add hydrogen iodide to an olefin such as hexene than it is to add hydrogen bromide, hydrogen chloride, or hydrogen fluoride in the order named. In the case of ethylene, hydrogen fluoride combines only with considerable difficulty and the present invention is concerned with a process for combining the olefins of higher molecular weight than ethylene with hydrogen fluoride. Some previous methods employed for the manufacture of alkyl fluorides, particularly those of low molecular weight, consisted in reacting alkyl iodides with silver or mercury fluorides and reacting hydrofluoric acid with alcohols. However, these methods are somewhat tedious and give only small yields of the desired fluorine compounds.

In one specific embodiment the present invention comprises a process for the production of alkyl fluorides from olefins of higher molecular weight than ethylene and from cyclo-olefins which comprises reacting the unsaturated compounds with hydrogen fluoride at minimum temperatures such as, for example, those comprised within the approximate range of —25 to —60° C. in the case of the aliphatic compounds.

The actual operation of the process will depend to some extent upon the phase of the hydrocarbons treated. In the case of the normally gaseous olefins including propylene and the butylenes, the simplest procedure in a batch operation is to add hydrogen fluoride to a pressure reactor and then add the olefin at a rate dependent upon the speed of the reaction as indicated by the drop in pressure in the pressure vessel. When utilizing the low temperatures specified, side reactions leading to the polymerization of the olefins is substantially eliminated so that increased yields of the desired alkyl or aryl fluorides are obtained. Continuous operations may be conducted by simultaneously injecting hydrogen fluoride and an olefin hydrocarbon into a cooled reactor while continuously separating the reaction products by low temperature fractionation or by the action of specific absorbents or solvents or by any other chemical methods. The details of such processes are more or less common practice and any suitable procedure may be utilized without departing from the scope of the invention.

When fluorides of normally liquid unsaturated hydrocarbons are desired, such compounds as hexenes or cyclo-hexene may be cooled to a suitable low temperature and treated simultaneously with proportioned mixtures of hydrogen fluoride either in batch or continuous processes. It is obvious that conditions of treatment will require modification in the case of different unsaturated hydrocarbons which will vary in their activity with their structure and their molecular weight, so that only general ranges of temperature, and the amount and proportion of hydrogen fluoride can be stated. As a rule only a small excess of hydrogen fluoride is necessary, of the order of about 1.25 moles.

The following examples are given to illustrate the results normally obtained by the process of the invention although not with the intention of unduly limiting its scope.

Example I

Using a nickel lined pressure vessel equipped with a mechanical stirring device, 200 parts by weight of anhydrous hydrogen fluoride were added under pressure at a temperature of —30° C. Propylene was then continuously added to maintain a pressure of approximately 50 lbs. per square inch until there was a marked pressure rise on a further addition which indicated the completion of the reaction. It was found that this point corresponded to the addition of one molecule of propylene for each one and one-half molecules of hydrogen fluorides. At the completion of the reaction the contents of the pressure vessel were released and fractionated at low temperatures for the recovery of propyl fluoride which was found to have been produced in a yield of about 75% of the propylene added. There was some production of high boiling polymers which were readily separated.

Example II

Into a pressure vessel supplied with an effective stirring device, 169 grams of anhydrous hydrogen fluoride were introduced by the method of first evacuating the vessel and then sucking in the gas. 335 grams of cyclo-hexene were gradually introduced over a period of five hours, the temperature being held below 0° C. by cooling, since the reaction was exothermic.

After the completion of the reaction, the total products from the pressure vessel were discharged into 200 grams of water and 346 grams of an insoluble oil was recovered. This was washed with water and dilute alkali and dried by filtering through anhydrous potassium carbonate. Attempts to distill this product at atmospheric pressure proved to be impossible on account of the decomposition occurring when a temperature of 90° C. was reached so that the product was distilled at 2 mm. absolute pressure. The following table shows the distillation results:

Charge, 220 grams
$d^{25}=0.943$
Pressure=2 mm.

| Fraction | B. P. range | Weight, grams | $d^{20}$ | $N_D^{25}$ | Color |
|---|---|---|---|---|---|
| 1 | <51 | 47 | .91 | 1.4170 | Water white. |
| 2 | 51–91 | 21 | .92 | 1.4748 | Do. |
| 3 | 91–120 | 4 | | 1.4799 | Amber. |
| Bottoms | >120 | 145 | | | Dark red. |

Fraction 1 from the above distillation was redistilled at 100 mm. pressure and the following table shows the results of this distillation. The fractions 3A, 4A, and 5A corresponded closely to the physical constants for fluorocyclo-hexane.

Charge, 23.4 grams
Pressure, 100 mm.

| Fraction | B. P. range | Weight, grams | $d^{20}$ | $N_D^{20}$ | M. P. |
|---|---|---|---|---|---|
| 1A | 30–39 | 6.6 | .86 | 1.4182 | |
| 2A | 39–42 | 5.5 | .88 | 1.4174 | |
| 3A | 42–43.1 | 3.1 | .88 | 1.4155 | 8. |
| 4A | 43.1–44.5 | 4.0 | .93 | 1.4151 | 10–12 |
| 5A | 44.5–45.5 | 2.3 | *.93 | 1.4146 | 12.6–13.4 |
| Bottoms | 45.5 | 1.0 | | 1.4670 | |

*$d_D^{20}=0.9258$.

The character of the invention is clearly shown by the above specification and numerical data neither of which is intended to be unduly limiting.

We claim as our invention:

1. A process for producing alkyl fluorides from olefins of higher molecular weight than ethylene which comprises reacting the olefin with hydrogen fluoride at a temperature below 0° C.
2. A process for producing alkyl fluorides from aliphatic olefins of higher molecular weight than ethylene which comprises reacting the olefin with hydrogen fluoride at a temperature within the approximate range of —25 to —60° C.
3. A process for the manufacture of propyl fluoride which comprises reacting propylene with hydrogen fluoride under super-atmospheric pressures and at temperatures below 0° C.
4. A process for the manufacture of butyl fluoride which comprises reacting a butylene with hydrogen fluoride under super-atmospheric pressures and at temperatures below 0° C.
5. A process for producing alkyl fluorides from normally gaseous aliphatic olefins of higher molecular weight than ethylene which comprises reacting the olefin with hydrogen fluoride at a temperature within the approximate range of —25 to —60° C.
6. A process for the manufacture of propyl fluoride which comprises reacting propylene with hydrogen fluoride under superatmospheric pressures and at temperatures within the approximate range of —25 to —60° C.
7. A process for producing propyl fluoride which comprises reacting propylene with hydrogen fluoride at a temperature within the approximate range of —25 to —60° C.
8. A process for producing butyl fluoride which comprises reacting a butylene with hydrogen fluoride at a temperature within the approximate range of —25 to —60° C.
9. A process for producing cyclo-alkyl fluorides which comprises reacting a cyclo-olefin with hydrogen fluoride at a temperature below 0° C.
10. A process for producing fluorocyclo-hexane hydrogen fluoride at a temperature below 0° C. which comprises reacting cyclo-hexene with hydrogen fluoride at a temperature below 0° C.

ARISTID V. GROSSE.
CHARLES L. THOMAS.